March 26, 1957  W. NEWMAN  2,786,446
BIRD FEEDER HAVING A BIRD SUPPORTING PLATFORM
Filed June 25, 1954  2 Sheets-Sheet 1

WILSON NEWMAN INVENTOR
BY *CA Snow & Co.*
ATTORNEYS.

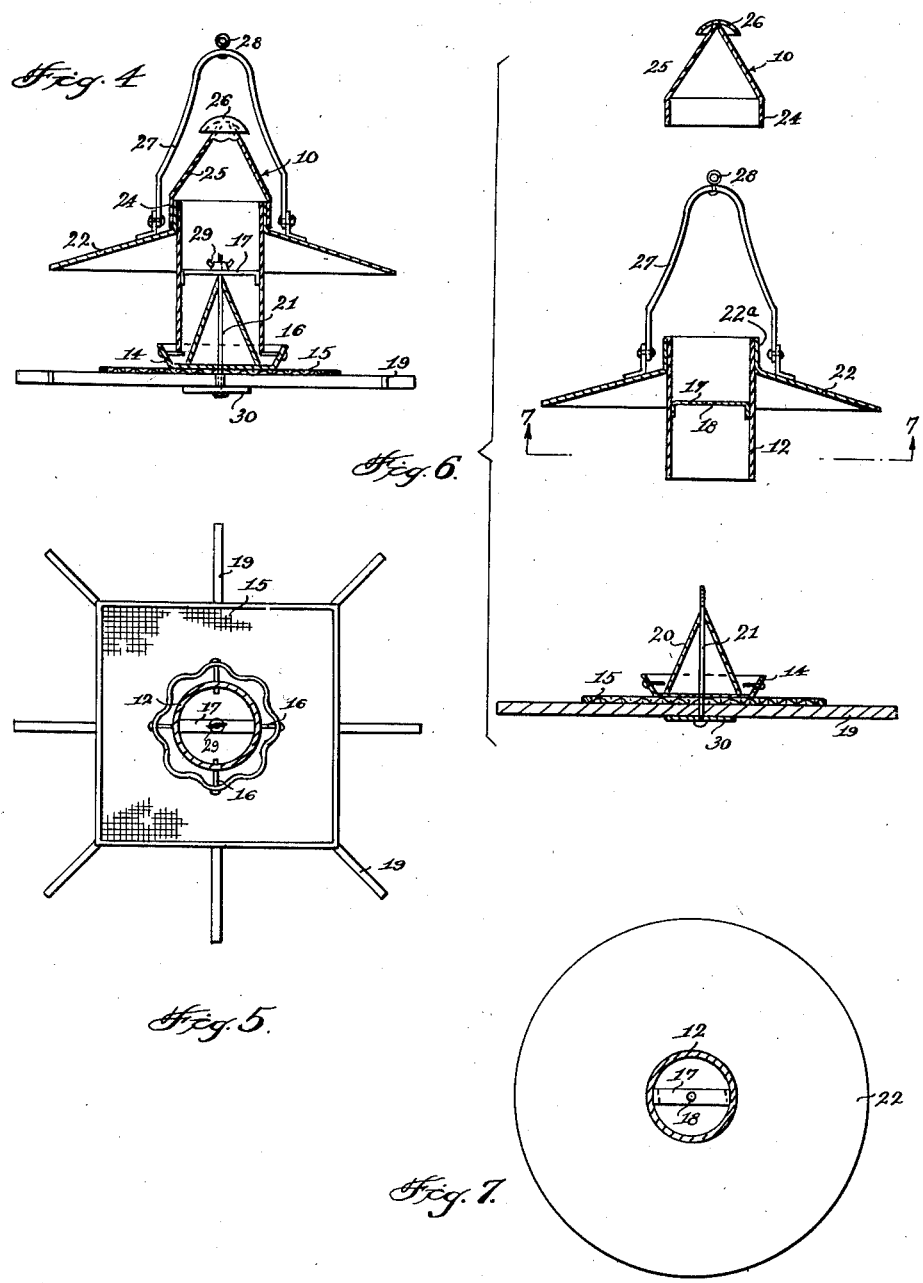

2,786,446

BIRD FEEDER HAVING A BIRD SUPPORTING PLATFORM

Wilson Newman, Ardmore, Okla.

Application June 25, 1954, Serial No. 439,245

1 Claim. (Cl. 119—52)

This invention relates to a bird feeder and more particularly to a bird feeder supporting device for supporting both the bird feed and the bird feeding therefrom.

It is an object of this invention to provide a bird feeding device which may be normally located out of doors above the ground for the safety of the birds as by suspension from a branch of a tree, the device having a bird feed hopper with bird landing platform secured on the lower side of the hopper, there being a feeding trough around the lower end of the hopper near the center of the platform.

It is a primary object of this invention to provide a bird feeding device of the kind to be more particularly described hereinafter which is relatively easy and economical in both its manufacture, by a person or manufacturer, and widespread distribution.

Other and further objects and advantages of the invention will be hereinafter described and the novel features thereof defined in the appended claim.

In the drawings:

Fig. 4 is a sectional elevation of the device taken on the line 4—4 of Fig. 2.

Fig. 5 is a section in plan taken on the line 5—5 of Fig. 1.

Fig. 6 is an exploded section in elevation of the device as seen in Fig. 4.

Fig. 7 is a section in bottom plan taken on the line 7—7 of Fig. 6.

Figure 1:
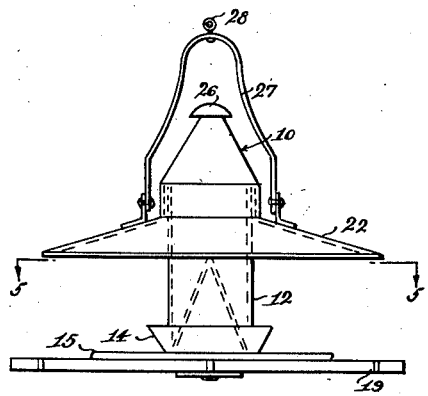
Fig. 1 is a side elevation of a bird feeding device constructed according to my invention.
Figure 2:
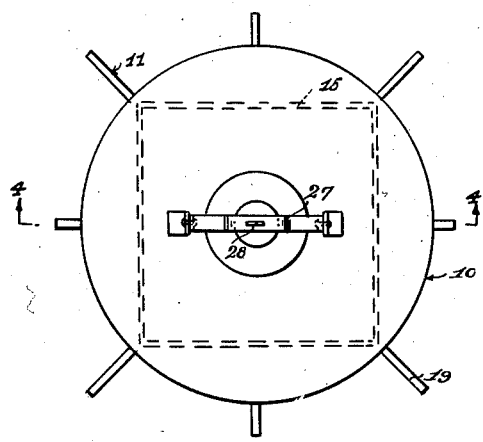
Fig. 2 is a top plan view.
Figure 3:
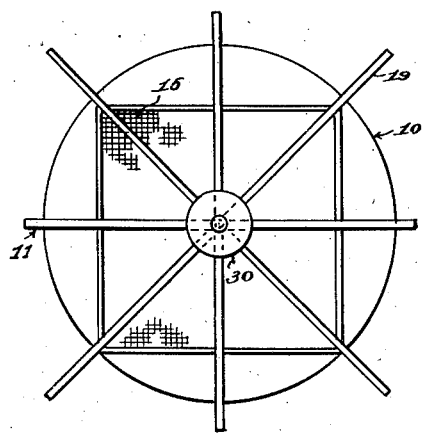
Fig. 3 is a bottom plan view of the device.

It is an object of this invention to provide a bird feeding device for feeding birds outdoors, as from a limb of a tree or other support and out of reach of animals such as cats or dogs which may molest the birds and keep the birds from feeding.

The bird feeding device 10, constructed according to my invention includes a horizontal platform 11 on which the birds may rest and a bird feed hopper 12 secured near the center of the platform so that the hopper when provided with bird food may entice the birds onto the platform 11 of the bird feeding device 10.

The hopper 12 is supported on the platform 11 with a cup 14 between the lower end of the hopper 12 and a mesh screen 15 on the platform 11.

Horizontally extending pins 16 are extended inwardly from the side edges of the cup 14 on which the lower end of the hopper 12 may be engaged for supporting the hopper above the cup 14 so that the bird seed within the hopper may be free to drop between the outer edge of the cup 14 and the outer edges of the hopper 12.

The hopper 12 is provided with a brace 17 intermediate the length thereof, the brace 17 extending transversely of the width of the hopper 12 intermediate the vertical length thereof. The brace 17 is provided with an opening 18 intermediate the length thereof. The platform 11 is initially formed of a plurality of shafts 19 which are disposed in a substantially radially outwardly extending position and joined at the center.

A food spreader 20 is supported on the cup 14 so that the food spreader 20, in its inverted position as shown in the drawings, will spread the bird food as it falls downwardly through the open end of the hopper 12 into the cup 14.

The food spreader 20 is held in a substantially centered position on the feeding device 10 by a vertically extending post 21 which extends vertically upwardly through the juncture of the rods 19 at the center of the platform 11 and opening 19 in brace 17, so that the food spreader, the hopper 12, cup 14 are held in assembled position.

In order to protect the bird feeding device 10 from rain or any dirt falling from above, a cover 22 extends radially outwardly over the upper open end of the hopper and of the mesh screen 15. The cover 22 is formed with a cylindrical flange 22ª fixed to and engaging about hopper 12.

The upper open end of the hopper 12 is substantially covered or closed by a frusto-conical portion of the cap cover 25 by a depending cylindrical flange 24 which extends downwardly from the inverted frusto-conical portion of the cap cover and loosely and removably engages about flange 22ª. The inverted frusto-conical portion of the cap cover 25 has a hood 26 overlying the juncture of the downwardly and outwardly extending side walls thereof.

A bail or strap 27 is pivotally secured to the upper side of the cover 22 and extends upwardly therefrom in a substantial overlying relation to the hood 26. A hook eye 28 is located on the bail 27 intermediate the length thereof through which some depending flexible element may be engaged for supporting the bird feeding device 10 from a limb of a tree or other outdoor object.

In the assembly of the bird feeding device 10 described above, the screw end of post 21 is initially engaged through the juncture of the rod 19, through the mesh screen 15 and opening 18 of the brace 17 in the hopper 12 for securing the hopper, mesh screen and the rods together for their use exteriorly of a house. A wing nut 29 is threadably engaged on the post 21 above the food spreader 20 and a washer 30 is disposed between the head or other end of the screw and the radially extending rods 19 to accomplish this assembly of the bird feeding device 10.

While the specific details of one embodiment of this invention have been herein shown and described, the invention is not confined thereto as changes and alterations may be made without departing from the spirit and scope thereof as defined in the appended claim.

I claim:

A bird feeder comprising a horizontal platform formed of radially disposed bars secured together at their inner ends, a screen disposed on the upper side of said platform, a feeding cup disposed on the upper side of said screen, said cup having an upturned rim, radially disposed inwardly projecting pins carried by said rim, a vertical bolt extending axially through said platform and said cup, a conical spreader in said cup, said bolt extending upwardly through the apex of said spreader, a cylindrical hopper about said spreader and seating on said pins, a horizontal bar fixed in said hopper between the ends thereof and having an opening through which said bolt extends, a nut threaded on said bolt for holding the hopper on said pins, a downwardly flared cover fixed to the upper end of said hopper, a cap removably engaging about the inner small end of said cover, and a bail pivotally carried by said cover.

References Cited in the file of this patent

UNITED STATES PATENTS

| | | |
|---|---|---|
| D. 115,321 | Pueschel | June 20, 1939 |
| 1,469,340 | Shortell | Oct. 2, 1923 |
| 1,534,375 | Foucht | Apr. 21, 1925 |
| 1,623,840 | Kassy | Apr. 5, 1927 |
| 1,815,679 | Ruth | July 21, 1931 |
| 2,005,188 | Hedrick | June 18, 1935 |
| 2,591,126 | Breck | Apr. 1, 1952 |

FOREIGN PATENTS

| | | |
|---|---|---|
| 538,040 | Germany | Nov. 9, 1931 |
| 126,047 | Australia | Nov. 10, 1947 |